US011831725B1

(12) United States Patent
Kim et al.

(10) Patent No.: US 11,831,725 B1
(45) Date of Patent: Nov. 28, 2023

(54) APPARATUS FOR ACCESSING TO 3D VIRTUAL WORLD THROUGH MULTIPLE DEVICES AND METHOD THEREOF

(71) Applicant: ERUGO WORLD Co., Ltd., Seoul (KR)

(72) Inventors: Jungsu Kim, Suwon (KR); Mingyu Kim, Suwon (KR)

(73) Assignee: ERUGO WORLD CO., LTD., Seoul (KR)

( * ) Notice: Subject to any disclaimer, the term of this patent is extended or adjusted under 35 U.S.C. 154(b) by 0 days.

(21) Appl. No.: 17/890,154

(22) Filed: Aug. 17, 2022

(30) Foreign Application Priority Data

Jun. 14, 2022 (KR) ........................ 10-2022-0072108

(51) Int. Cl.
| | | |
|---|---|---|
| G06F 15/16 | (2006.01) | |
| H04L 67/146 | (2022.01) | |
| H04L 67/00 | (2022.01) | |
| H04L 67/141 | (2022.01) | |

(52) U.S. Cl.
CPC .......... *H04L 67/146* (2013.01); *H04L 67/141* (2013.01); *H04L 67/34* (2013.01)

(58) Field of Classification Search
CPC ...... H04L 67/34; H04L 67/141; H04L 67/146
USPC ........................................................ 709/204
See application file for complete search history.

(56) References Cited

U.S. PATENT DOCUMENTS

| | | | | |
|---|---|---|---|---|
| 6,370,565 B1* | 4/2002 | Van Gong | ................ | H04L 9/40 |
| | | | | 709/205 |
| 8,553,028 B1* | 10/2013 | Urbach | ................ | H04N 21/816 |
| | | | | 345/473 |
| 8,683,349 B2* | 3/2014 | Roberts | ............... | G06F 3/04815 |
| | | | | 715/747 |
| 9,032,288 B2* | 5/2015 | Karlsson | ............. | G06F 3/04815 |
| | | | | 715/251 |
| 9,214,038 B1* | 12/2015 | Urbach | ................... | G06T 15/04 |
| 9,659,400 B2* | 5/2017 | Urbach | ................ | G06F 3/1415 |
| 10,229,421 B2* | 3/2019 | Baszucki | ............... | G06Q 30/02 |
| 11,256,384 B2* | 2/2022 | Qiu | ..................... | A63F 13/2145 |
| 11,450,065 B2* | 9/2022 | McCall | ............. | G02B 27/0172 |
| 11,521,355 B1* | 12/2022 | Goetzinger, Jr. | ...... | G06F 3/0482 |
| 2010/0205035 A1* | 8/2010 | Baszucki | ............ | G06Q 20/102 |
| | | | | 705/40 |
| 2011/0066928 A1* | 3/2011 | Karlsson | ............. | G06F 16/4393 |
| | | | | 715/202 |
| 2014/0337734 A1* | 11/2014 | Bradford | .................. | G09B 5/00 |
| | | | | 715/719 |
| 2017/0148267 A1* | 5/2017 | Parker | ................... | G07F 17/323 |
| 2020/0098173 A1* | 3/2020 | McCall | ................... | G06T 19/20 |
| 2021/0197989 A1* | 7/2021 | Sercel | ................... | B64G 1/405 |
| 2022/0383604 A1* | 12/2022 | McCall | ................... | G06F 3/017 |
| 2023/0083909 A1* | 3/2023 | Haro | ..................... | H04N 7/157 |
| | | | | 345/619 |

* cited by examiner

*Primary Examiner* — Moustafa M Meky
(74) *Attorney, Agent, or Firm* — Heedong Chae; Lucem, PC

(57) ABSTRACT

The present invention relates to an apparatus for accessing to a 3D virtual world through multiple devices and a method thereof, and more specifically, to an apparatus and a method for accessing to a 3D virtual world through multiple devices, capable of enabling a user to access a virtual world through various devices to enjoy services and providing the optimum access environment.

4 Claims, 2 Drawing Sheets

APPARATUS FOR ACCESSING TO 3D VIRTUAL WORLD THROUGH MULTIPLE DEVICES AND METHOD THEREOF

CROSS-REFERENCE TO RELATED APPLICATIONS

This application claims the priority of Korean Patent Application No. 10-2022-0072108 filed on Jun. 14, 2022, in the Korean Intellectual Property Office, the disclosure of which is incorporated herein by reference.

BACKGROUND OF THE INVENTION

Field of the Invention

The present invention relates to an apparatus for accessing to a 3D virtual world through multiple devices and a method thereof, and more specifically, to an apparatus and a method for accessing to a 3D virtual world through multiple devices, capable of enabling a user to access a virtual world through various devices to enjoy services and providing the optimum access environment.

Background Art

In general, an Internet-based 3D virtual world, that is, metaverse, as an expanded concept of the existing virtual world, creates a specific situation or environment using a computer and provides the situation or environment to a user so as to allow the user to directly manipulate the virtual world, thereby providing an effect like an actual experience. A user can make his or her own avatar, do various social and cultural activities, and do commercial activities, such as shopping or production and sale of products, using virtual currency in the virtual world like in the real world so that the user can freely go in and out of the real world and the virtual world.

However, conventionally, when a number of users access to the virtual world at the same time using multiple devices, it is difficult to recognize each user, distinguish a user from other users, or recognize locations of the users in the virtual world, and it is also difficult for many users to experience at the same time in one space.

PATENT LITERATURE

Patent Documents

Patent Document 1: Korean Patent No. 1839118 (03. 09, 2018, entitled "Multi-access virtual space providing system linked to position in real space of multiple users"
Patent Document 1: Korean Patent Laid-open No. 2017-143264, entitled "Virtual reality multi-access monitoring system and method thereof"

SUMMARY OF THE INVENTION

Accordingly, the present invention has been made to solve the above-mentioned problems occurring in the prior arts, and it is an object of the present invention to provide an apparatus for accessing to a 3D virtual world through multiple devices and a method thereof, which enable a user to enjoy one virtual world through various access devices, thereby realizing a new virtual world that is not dependent on access devices.

To accomplish the above object, according to the present invention, there is provided an apparatus for accessing to a 3D virtual world through multiple devices including: a host server for constructing a full 3D virtual world; an analysis unit for analyzing system capability of each user device connected to the host server; a classification server for creating and classifying a distinguishment keyword according to system attributes of each user device analyzed by the analysis unit; and multiple access clients which have various access devices, are connected to Internet, and request access permission to the host server to participate in one virtual world.

In another aspect of the present invention, there is provided a method for accessing to a 3D virtual world through multiple devices including: a client installation step of installing a client in an individual access device; a client activation step of accessing to a classification server by a client installation device via Internet; an identifier distribution step of processing data from an interface of the client installation device and identifying individual clients to distribute identifiers individually; a viewpoint and controller assignment step of dividing a user access means accessing to the virtual world into an appropriate viewpoint and a controller; and a virtual world server accessing step of allowing multiple clients to access to one host server.

As described above, the method for accessing to a 3D virtual world through multiple devices according to the present invention enables users to manage the optimum virtual world according to access devices by dividing access means of the users, who access to the virtual world, into an appropriate viewpoint and a controller, and enables the users to use integrated services allowing the users to access to one host server using various access devices. Therefore, the apparatus and the method for accessing to a 3D virtual world through multiple devices according to the present invention have an economical effect since there is no need that multiple devices access to multiple host servers and there is no need to invest unnecessary resources.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, the embodiments of the present disclosure will be described in detail with reference to accompanying drawings so that the embodiments may be easily implemented by those skilled in the art. However, the present disclosure may be implemented in various ways without being limited to the embodiments.

Figure 1:
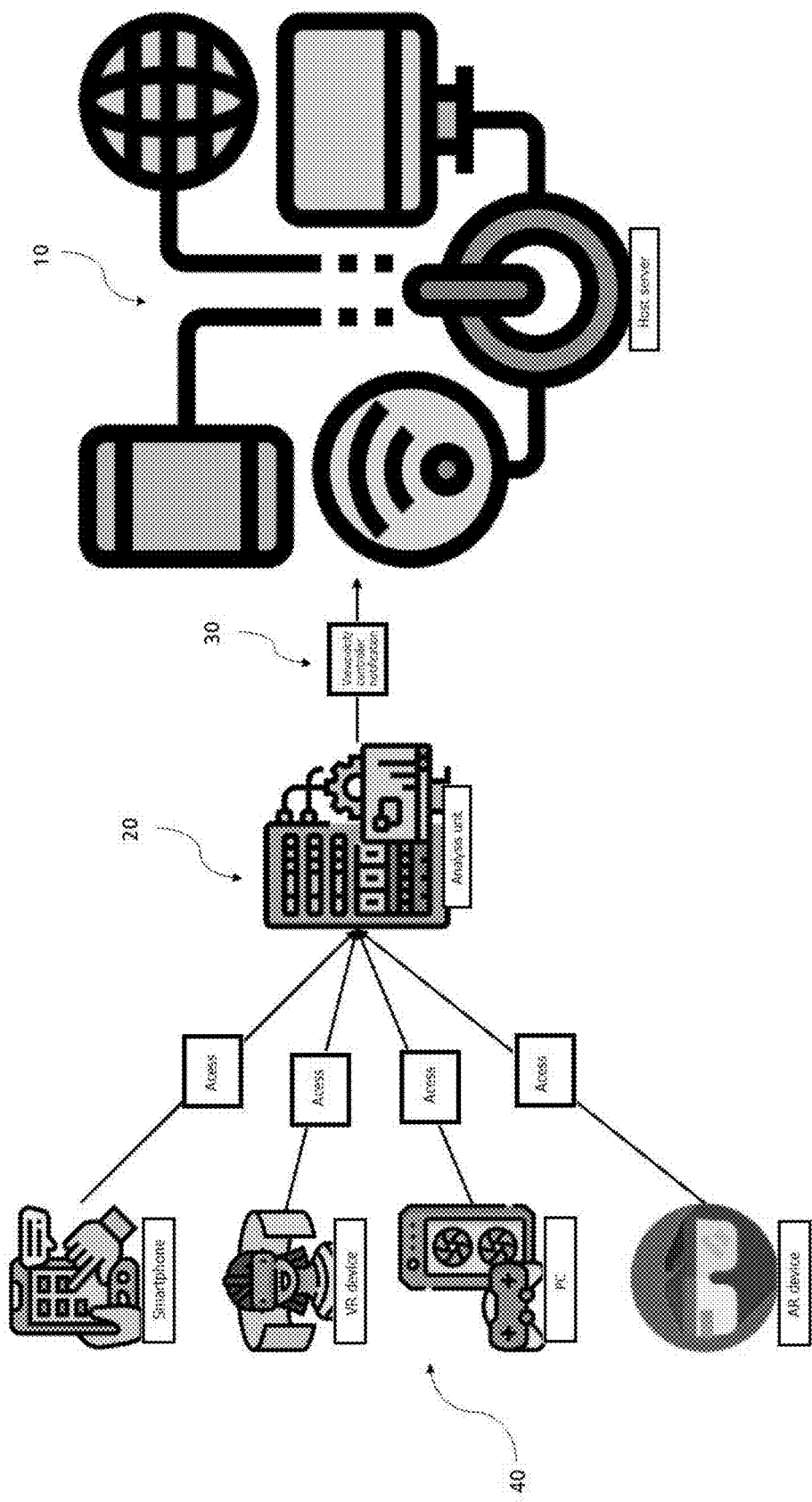
FIG. 1 is a conceptual diagram of an apparatus for accessing to a 3D virtual world through multiple devices according to an embodiment of the present invention.

FIG. 1 is a conceptual diagram of an apparatus for accessing to a 3D virtual world through multiple devices according to an embodiment of the present invention.

In the drawing, the apparatus for accessing to a 3D virtual world through multiple devices according to an embodiment of the present invention includes: a host server 10; an analysis unit 20; a classification server 30; and a multiple access client 40.

The above will now be described in detail.

The host server 10 is a server for constructing a full 3D virtual world, and provides a service to a user after collecting and storing data transmitted to the user.

The host server 10 can construct the real world into a virtual world by using a 3D camera, and provide various viewpoints, that is, coordinates of the virtual camera by adjusting an angle of the camera.

In this instance, the camera includes coordinate information of a photographing position.

The host server 10 has various control methods for a single action of a user, and allows multiple access clients, which will be described later, to individually manage avatars in the virtual world through combination of the viewpoints and the control methods.

The analysis unit 20 analyzes the system capability of each user device connected to the host server, and scans the system to analyze an interface, such as a monitor, a sound card, a graphic card, and a manipulator (mouse, a keyboard, etc.) of an installation device when a client is installed.

The classification server 30 is a server to create and classify keywords according to the system attributes of each user device analyzed by the analysis unit. The classification server evaluates individual access of the multiple access clients according to criteria stored in the server, creates and classifies, and stores keywords corresponding to the evaluation, and creates and stores a new keyword after recognizing the accessed client according to a predetermined classification rule.

The classification cover 30 assigns a viewpoint using a camera angle and a controller for interface operation to each user interface when multiple clients access.

The multiple access client 40 are various access devices, and requests access permission to the host server (virtual world server) to participate in one virtual world by being connected to the Internet. The multiple access client 40 transmits its own viewpoint and a key value of the control to the classification server when accessing to the host server 10.

The multiple access devices connected to the virtual world server 10 may be a user's smart phone, a tablet, a laptop PC, an AR instrument, a VR instrument, and the like.

Next, a method for accessing to a 3D virtual world through multiple devices according to an embodiment of the present invention will be described.

Figure 2:
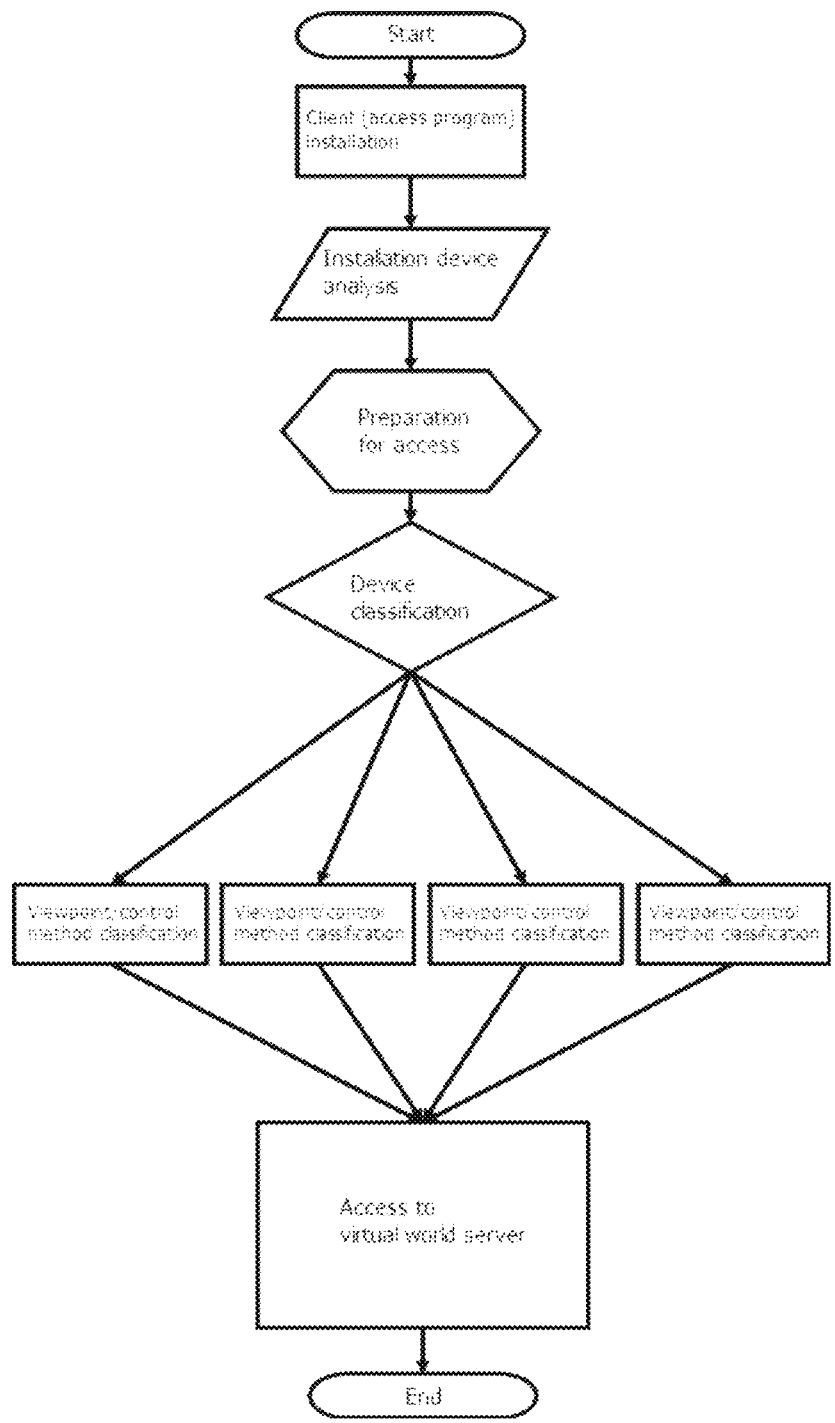
FIG. 2 is a flow chart of a method for accessing to a 3D virtual world according to an embodiment of the present invention.

FIG. 2 is a flow chart of a method for accessing to a 3D virtual world according to an embodiment of the present invention.

The present invention an access device classifying method through keywords for distinguishing clients. As illustrated in the drawing, the method for accessing to a 3D virtual world through multiple devices according to an embodiment of the present invention includes: client installation; client activation; identifier distribution; assignment of viewpoint and controller; and access to a virtual world server.

The above will be described in detail.

(1) Client Installation

First, a client installation is carried out in an individual device, such as a user PC, by using an access program to access to a virtual world.

In this instance, when the access client is installed, it scans the system to analyze a resource interface of the installation device, executes simplification and confidential data processing of features of each device, and confirms a client's access when the client accesses to the server so as to induce the optimum access suitable for the corresponding device.

(2) Client Activation

The client installation device accesses to the classification server via the Internet.

(3) Identifier Distribution

The classification server processes data from the interface of the installation device of the client and distributes an identifier identifying the individual client. In this instance, the distribution is performed by a key value classified into a socket, namely, a viewpoint and a controller.

(4) Classification of Viewpoint and Control Method

In the access method according to the present invention, it is the most characteristic method to divide the user's access means for accessing to the virtual world into an appropriate viewpoint and a controller. That is, the client is assigned into a viewpoint and a controller in the host server according to the socket.

(5) Host Server Access

Each client accesses to one host server, and in this instance, the client transmits key values of the viewpoint and the controller to the classification server while accessing to the host server.

In addition, each access client can explore the virtual world while steering the avatar in the host server with the stored time and controller.

As described above, in the apparatus and the method according to the present invention, the host server which analyzes system capacity of the corresponding device of the access client, creates a distinguishment keyword, and construct a virtual world, can classify clients requesting access permission, thereby enabling the client to access to one virtual world using various access devices by using the optimum access method.

What is claimed is:

1. An apparatus for accessing to a 3D virtual world through multiple devices comprising:
    a host server for constructing a full 3D virtual world;
    an analysis unit for analyzing system capability of each user device connected to the host server;
    a classification server for creating and classifying a distinguishment keyword according to system attributes of each user device analyzed by the analysis unit; and
    multiple access clients which have various access devices, are connected to Internet, and request access permission to the host server to participate in one virtual world.

2. The apparatus according to claim 1, wherein the classification server assigns a viewpoint using a camera angle and a controller for interface operation to each user interface when multiple clients access.

3. A method for accessing to a 3D virtual world through multiple devices, the method comprising:
    a client installation step of installing a client in an individual access device;
    a client activation step of accessing to a classification server by a client installation device via Internet;
    an identifier distribution step of processing data from an interface of the client installation device and identifying individual clients to distribute identifiers individually;
    a viewpoint and controller assignment step of dividing a user access means accessing to the virtual world into an appropriate viewpoint and a controller; and
    a virtual world server accessing step of allowing multiple clients to access to one host server, wherein the multiple devices access to the 3D virtual world using an individual access device classification method through a client distinguishment keyword.

4. The method according to claim 3, wherein in the client installation step, a resource interface of the installation device is analyzed when the access client is installed.

* * * * *